United States Patent [19]

Rodd et al.

[11] 4,413,649

[45] Nov. 8, 1983

[54] AIR PRESSURE REGULATOR

[76] Inventors: Charles R. Rodd; Doris M. E. Rodd, both of Rte. 3, Box 59; Richard L. Scheuerman, 317 E. Chestnut, all of Redwood Falls, Minn. 56283

[21] Appl. No.: 363,017

[22] Filed: Mar. 29, 1982

[51] Int. Cl.³ ............................................. F16K 31/12
[52] U.S. Cl. ............................... 137/505.39; 137/505; 137/505.18; 137/505.37; 137/505.42; 267/175; 267/177
[58] Field of Search .............. 137/505, 505.18, 505.37, 137/505.39, 505.42; 267/175, 177

[56] References Cited

U.S. PATENT DOCUMENTS

| 3,088,486 | 5/1963 | Salmon | 137/505.42 X |
| 3,357,687 | 12/1967 | Vandorpoel | 137/505.42 X |
| 3,856,042 | 12/1974 | Fletcher | 137/505.42 |
| 4,159,105 | 6/1979 | Vanderlaan | 267/177 X |

Primary Examiner—Harold W. Weakley
Attorney, Agent, or Firm—Kinney, Lange, Braddock, Westman and Fairbairn

[57] ABSTRACT

A nine position air pressure regulator includes a main regulator body member having an unregulated first pressure cavity, a regulated second pressure cavity and a valve seat between the cavities. A diaphragm is in sealing relationship to the second cavity, and the first end of a pressure regulation spring presses against the diaphragm to tend to force it into the second cavity. The spring operates inside of a cylinder, and a yoke is located at the second end of the spring away from the diaphragm. A rotor ring is rotatably mounted with respect to the main body member and threadably mounts a plurality of pairs of cap screw stops. The stops of each pair of screw stops are spaced 180° apart from each other around the rotor and are adjusted to terminate at the same distance from the rotor bottom. By rotating the rotor ring, any desired pair of screw stops can be vertically aligned under the outer ends of the yoke. A piston cup in the cylinder forces the yoke and the spring toward the diaphragm under air pressure. When air pressure is applied to the piston cup in the cylinder, the spring is compressed until the yoke screw stops determines the tension on the spring and so that level of regulated pressure available at the regulated second pressure cavity.

19 Claims, 8 Drawing Figures

AIR PRESSURE REGULATOR

BACKGROUND OF THE INVENTION

1. Field of the Invention

This invention has relation to air pressure regulators and particularly to a type of air pressure regulator which can be preset to be capable of delivering air at any one of a number of preselected regulated pressures by stepping a regulator control through a number of different settings.

2. Description of the Prior Art

Compressed air is commonly used in many situations, for example in operating torque wrenches in manufacturing plants; spray painting; and in greasing, filling tires, removing tires from rims and operating other appliances at automobile service stations, to name but a few.

In each of these uses and in many other uses, it is desirable or necessary to have the air delivered at any one of several different carefully and accurately regulated pressures. For example, in an assembly plant, a major quality problem is loose or otherwise improperly torqued nuts and bolts. In such assembly operations, the proper torque for one particular nut and bolt assembly will not necessarily be the same as for another such assembly.

In certain air operated torque wrenches, the pressure of the incoming air determines the torque exerted. Before the present invention, in order to vary the pressure of the air supply and therefore the torque, it was necessary to manually turn an adjusting screw on an air pressure regulator to vary the tension in an adjusting spring until the desired pressure was obtained on an air gauge. This had to be done each time a different pressure was needed. This made the change of pressure very, very time consuming and made it virtually impossible to repeat the exact pressures time after time.

Another method of attempting to obtain the proper torquing requires use of an impact wrench connected to an air source at a single pressure. The operator then had to try to count the number of raps or impacts delivered by the wrench on a particular nut or bolt assembly and had to interrupt the operation of the wrench when the number corresponding to the desired torque was reached.

Another extremely expensive and cumbersome way to obtain different pressures which is currently in use is to hook the input conduits of three separate air pressure regulators to a single source of unregulated air pressure through a three-way valve, to set each regulator at a different pressure, and then to connect a different impact wrench to the outlet conduit of each of the regulators.

What was needed before the present invention was a single air pressure regulator which could be rapidly and substantially instantaneously adjusted to yield any one of a large number of different air pressures, and to do so in a manner that the air pressure delivered at a particular setting will be repeated accurately many times.

In a search of the prior art, the following patents were cited:

| U.S. Pat. Nos. | | |
| --- | --- | --- |
| 1,015,164 | W. T. Fowden | January 16, 1912 |
| 1,343,160 | E. J. Schmidt | June 8, 1920 |
| 2,735,669 | E. E. Seiler | February 21, 1956 |

The Seiler patent discloses a calibrated cam means which replaces the adjustment screw in tensioning the spring operating on the diaphragm. In effect, this appears to be substantially the same mechanism as used in a standard regulator such as the Coilhose Pneumatics Fluid Power Products Air Line Regulator shown in Catalog Sheet PP-R479B, presented with this application; except that a cm 44 mounted on an axle 46 is turned by knob 56 in the Seiler patent whereas the adjustment of the adjusting spring 7 in the Coilhose Regulator is accomplished by rotating the adjusting screw assembly 1.

The patent to Fowden does not seem to be pertinent. It discloses merely an adjustment of a spool valve accomplished by the rotating of the spool to align it with more or less valve openings. A hand-wheel 15 rotates the spool valve and a finger 20 indicates the positioning of the valve spool inside of the valve.

The patent to Schmidt does not appear to be pertinent. It shows a pressure relief valve that is adjusted by adjusting the tension in a coiled spring by rotating a threaded sleeve having an indicator pointer thereon.

Applicants and those in privity with them are aware of no prior art which is closer than those discussed above and are aware of no prior art which anticipates the claims made herein.

SUMMARY OF THE INVENTION

A multi-value fluid pressure regulator includes a main body member which is provided with an unregulated first pressure cavity, a regulated second pressure cavity, and a valve seat between the cavities. A diaphragm is in sealing relation to the second cavity and is spaced from the valve seat. A first inlet conduit open from a source of fluid such as air under a maximum pressure opens to the first cavity and a second conduit to deliver air, for example, at a regulated pressure opens from the second cavity to a location for use of the air. A regulator valve is operably associated with the diaphragm to move into sealing relation with respect to the valve seat when the diaphragm moves away from the second cavity, and to move into clearing relation to the valve seat when the diaphragm moves toward the second cavity. A pressure regulation spring has a first end in force transmitting relation to the diaphragm in position to tend to move the diaphragm toward the second cavity when the spring is depressed. There is a spring harness on a second end of this regulation spring, and there is drive means operative on the spring harness to force the pressure regulator spring to tend to move the diaphragm in the second direction.

Control means are provided to selectively enable and disable the spring drive means. In the form of the invention as shown, the spring drive means includes air under pressure acting on a piston cup in a cylinder. The control means includes means to selectively supply air pressure to the piston cup in the cylinder to enable the drive means; and to cut off the air pressure and open the piston cup to atmospheric pressure to disable the drive means.

A yoke or bar is operably connected with the spring harness to move with it. A plurality of bar movement stop means are movably mounted with respect to the main body member and are positionable selectively in alignment with the bar to interrupt movement of the bar as it moves with the spring harness in direction toward the second cavity.

Each of the stop means is of a configuration such that when that particular stop means in operative alignment with the bar, it will interrupt the bar movement in direction toward the second cavity at a different operative distance from the valve seat from that of other stop means when so aligned. Thus the minimum pressure in the second chamber at which the regulator valve first comes into sealing contact with the valve seat can be different for every different stop means when aligned with the bar.

DETAILED DESCRIPTION OF THE PREFERRED EMBODIMENTS

A multi-value air pressure regulator 10 includes a main frame 12 which can be mounted at a convenient location for use, for example, on a vertical support wall 14. When in use, the regulator can be protected by cover 15 around the main frame. A body assembly 16 of the regulator is mounted for limited vertical movement with respect to the main frame 12 and includes a top cap 18, a main body member or casting 20, a flexible diaphragm 22, machine screws 23 and a cylinder head 24 sealably mounting the diaphragm to the main body member, a cylinder 26 extending down from the cylinder head 24 and a cylinder base 28 bolted with machine screws 29 through the cylinder head 24 and into the main body member 20 to hold the cylinder in place and to assist in holding the diaphragm in place.

The main body member 20 is provided with an unregulated first air cavity 19, a regulated second air cavity 21 and a valve seat 25 between them.

A pressure-value selection rotor ring 30 is rotatably mounted with respect to the cylinder head 24 between a snap-in retaining ring 31 and load bearing shim 33 of nylon or the like. The rotor 30 is rotatable through the instrumentality of a selection lever and handle 32 which is attached to it and extends above the main frame 12. Rotor 30 forms part of a rotor ring assembly.

A diaphragm assembly 34 is mounted to the center of the diaphragm 22 to move with it. The diaphragm assembly consists of a diaphragm plug 62 threadably mounted in a diaphragm plate 60 through a central opening in the diaphragm to sealingly trap the diaphragm 22 between them.

A stem, valve and regulator assembly 36 is mounted in the main body member 20 and is urged by a top cap spring 38 in direction toward the diaphragm. The stem, valve and regulator assembly 36 includes a regulator valve 58 situated to move into and out of sealing relationship with respect to valve seat 25 from above valve seat 25, a valve stem 56 extending integrally downwardly from the regulator valve 58 and situated in pivotal relationship to the diaphragm plug 62 in a dish-shaped opening provided in the plug. The regulator valve 58 includes a cylindrical boss 68 riding in a provided opening 69 in top cap 18.

On the under side of the diaphragm, a linear rate compression pressure regulation spring 42 is held up against the bottom of the diaphragm plate of the diaphragm assembly 34 by a spring button or harness 44 which rests on a pin 45 which extends upwardly from a pressure limit stop yoke or bar 46. This yoke 46 is pivotally mounted as at 47 to a bracket 49 fixedly mounted on top of a piston cup 48 which is operably mounted in cylinder 26.

Air pressure from an unregulated source of supply (not shown) is introduced into the first air cavity 19 of the main body casting 20 through an air inlet conduit 50, and air under regulated pressure leaves the second air cavity 21 of the main body casting through an air outlet conduit 52.

A plurality of pairs of piston stroke screw stops 54,54 are threadably adjustably mounted in provided openings 53 along the bottom edge of the pressure-value selection rotor ring 30. Each screw stop of each pair is located 180° from the other across the axis of the rotor ring, and the screw heads of each pair are adjusted to be at identical distances from the bottom of the rotor. The distance from the bottom of a pair of screw stop heads to the bottom of the rotor ring is an inverse function of the regulated output pressure desired when the pressure limit stop bar 46 is aligned with that pair.

The screw stop receiving openings 53 go clear through the rotor 30 and are so positioned as to form at their upper end portions, detent channels to help positively and accurately position the rotor to achieve different regulated pressures in a manner to be described.

The rotor selection handle and lever 32 is rotated to align the bar or yoke 46 vertically under a particular or first pair 55 of piston stroke screw stops 54 when a particular value of regulated output air pressure is needed, and air pressure is introduced into that portion of cylinder 26 between the piston cup 48 and the cylinder base 28 so that the piston cup 48 will act on the spring button 44 to tend to compress the regulator spring 42. Movement of the bar 46 in direction toward the diaphragm will be arrested by contact with both of the screw stops 55 with which it is vertically aligned. Upward bar movement causes the diaphragm assembly 34 to raise the stem, valve and regulator assembly 36 to allow air to pass by regulator valve 58 and through valve seat 25 from the inlet conduit 50 and first air cavity 19 to the second air cavity 21 and the air outlet conduit 52 until the pressure in the outlet conduit and the second air cavity acting on the diaphragm 22 is sufficient to move the diaphragm down against action of the regulator spring 42 to cause regulator valve 58 to close off the valve seat opening between the cavities. When the air in the second air cavity 21 and the outlet conduit 52 drops below its nominal regulated value, the stem, valve and regulator assembly will open sufficiently to let the inlet air bring the pressure up to the regulated pressure again.

To change nominal pressure values, the air pressure working on the piston cup 48 is cut off, and the cylinder 26 and piston cup opened to atmospheric pressure.

At this point, top cap spring 38 will act to close the stem, valve and regulator assembly 36, and the inlet air pressure in first cavity 19 acting on regulator valve 58 will tend to hold it closed. The selector lever and handle 32 and the pressure-value selection rotor ring 30 will again be rotated, to align with another or second pair of piston stroke screw stops 54, representing another desired regulated pressure, and the bottom of cylinder 26 will again be sealed and high pressure air will again be introduced into it to force the piston cup 48 to compress the regulator spring 42 sufficiently to bring the yoke or bar 46 into contact with the second pair of screw stops 54 to cause the output from the air outlet conduit 52 to be within the range of the newly selected regulated pressure.

Figure 1:
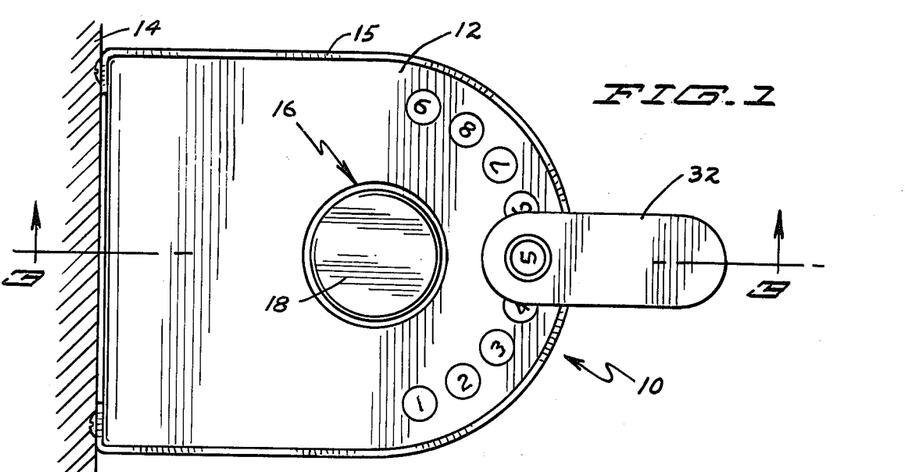
FIG. 1 is a top plan view of an air pressure regulator made according to the present invention.

Alignment of the bar 46 with each pair of screw stops 54 is achieved partially by having nine positions of the rotor and consequently of the handle 32 numbered and inscribed on the top surface of the main frame and by providing an opening through the handle so positioned that the bar 46 is aligned with a different set of screw stops each time a different position number appears through the opening. See FIG. 1.

Precise alignment is achieved by having a spring loaded detent ball 51 mounted in cylinder head 24. The ball perfectly positions the bar in alignment with one of the pairs of stops 54,54 every time it drops into one of the detent grooves provided by one of the openings 53.

Control of the unregulated air pressure into the lower portion of cylinder 26 is provided by a spool valve assembly 70 including a spool valve body opening 72 extending vertically through the cylinder base 28 and a spoon valve 74 operably mounted to slide with respect to the valve body opening 72 but fixedly mounted with respect to the main frame 12. A fluid drive air pressure conduit 76 is open through an air passageway 78 provided through the main body member 20 to the first air cavity 19 and through an air passageway 80 provided in the cylinder base 28 to an upper portion of the spool valve body opening 72.

An upper portion 82 of the fluid drive pressure conduit 76 is rigid and extends outwardly from the main body member 20 of the body assembly 16 where it is entrapped by a bracket 84 mounted on the main frame 12 to prevent rotation of the main body member and the parts fastened to it during rotation of the rotor ring 30 through the instrumentality of the selection handle 32. At the same time, the bracket 84 does not prevent vertical movement of the upper portion 82 of the conduit 76. This allows the entire body assembly 16 to have limited vertical movement with respect to the main frame 12 as is necessary to operate the spool valve 74 with respect to the spool valve body opening 72.

Figure 2:
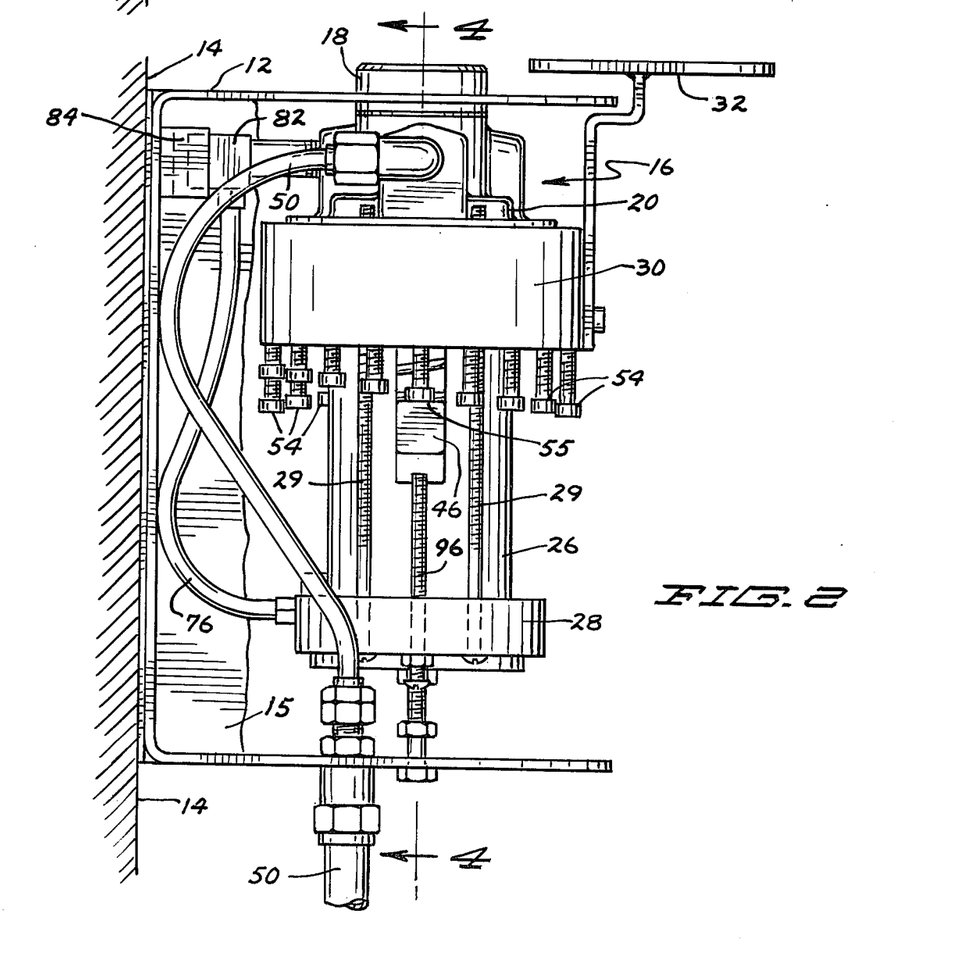
FIG. 2 is a side elevational view of the air pressure regulator of FIG. 1 with portions of the cover broken away with the parts of an "AIR ON" position to introduce high pressure unregulated air to an air cylinder of the regulator.
Figures 3, 3A:
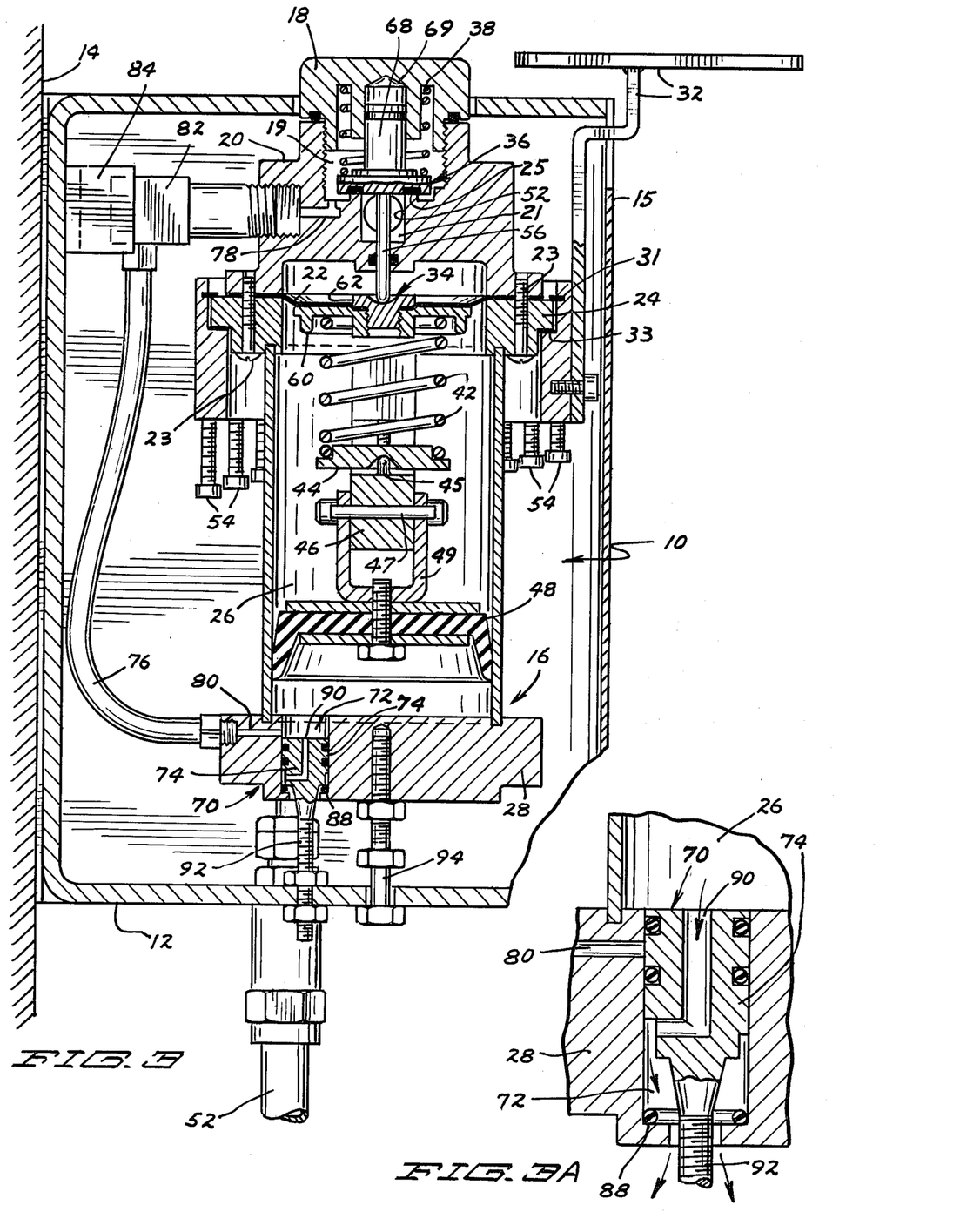
FIG. 3 is an enlarged vertical sectional view taken on the line 3—3 in FIG. 1 also showing the parts positioned to introduce unregulated air to the regulator.
FIG. 3A is an enlarged fragmentary vertical sectional view of a spool valve assembly of FIG. 3 but with the parts in an "AIR OFF" position so that the air pressure to the air cylinder of the regulator is cut off.
Figure 4:
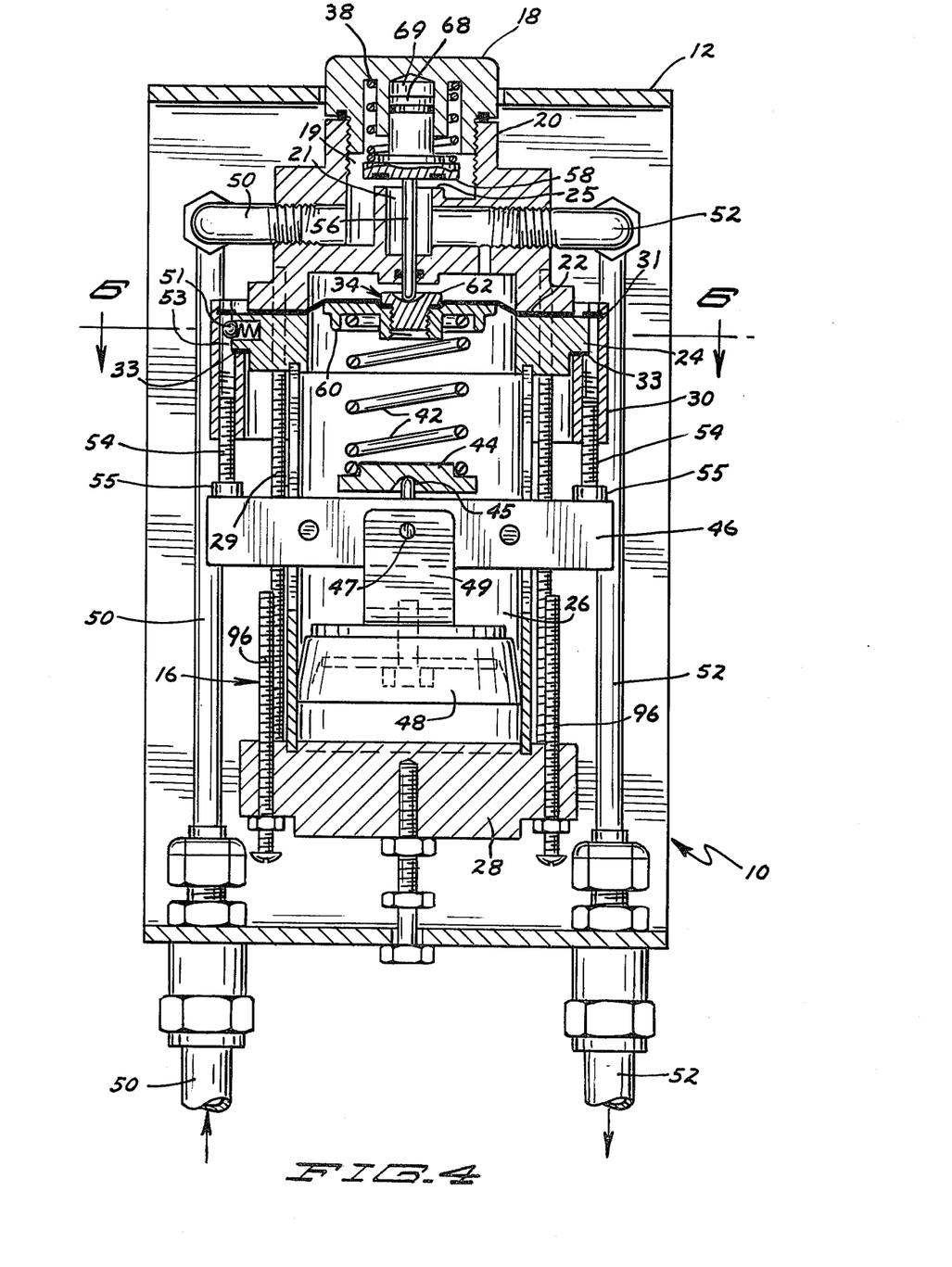
FIG. 4 is an enlarged vertical sectional view taken on the line 4—4 in FIG. 2 with parts in the "AIR ON" position, but with the cover removed.

With the parts positioned as seen in FIGS. 2, 3 and 4, unregulated air pressure is introduced through the spool valve body opening 72 into the lower portion of the cylinder 26 thus forcing the piston cup 48 to drive the bar 46 into contact with the pair of screw stops 55 with which it is vertically aligned, resulting in the desired regulated pressure being available from the air outlet conduit 52. The force with which the piston cup 48 holds the bar or yoke 46 against its vertically aligned screw stops 55 is such that it is not possible to accidentally turn the rotor 30 to align another set of screw stops 54 with the yoke 46 while the air is on. Therefore, the pressure setting cannot be changed accidentally either.

With the air pressure "ON" in the cylinder 26, an O-ring 88 between a lower tapered portion of spool valve 74 and a narrowed lower portion of the valve body opening 72 seals the one with respect to the other so that no pressure can escape through the bottom of the cylinder base 28.

To change the regulated pressure, the air to the cylinder 26 must be cut off and the pressure reduced to atmospheric to allow the spring 38 and retraction of spring 42 to close regulator valve 58 on the valve seat 25. This is done by pushing down on the selection handle 32 and/or on the top cap 18 to force the valve body opening 72 in the cylinder base 28 down on the spool valve 74 against the action of the pressure in the cylinder.

Figures 5, 6, 7:
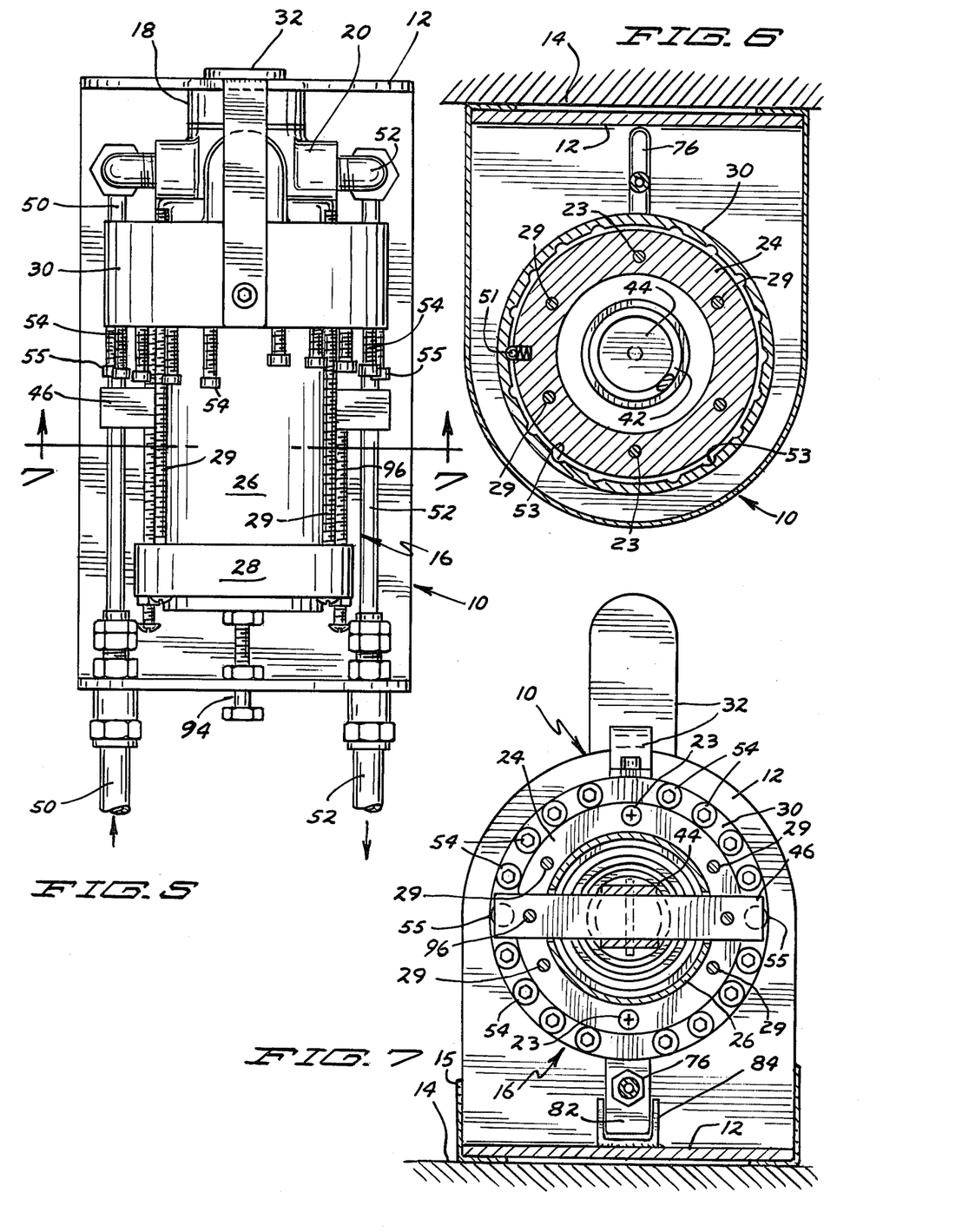
FIG. 5 is a front view of the regulator as seen from the right in FIG. 2 but with the parts in the "AIR OFF" position and with the cover removed.
FIG. 6 is a reduced horizontal sectional view taken on the line 6—6 in FIG. 4.
FIG. 7 is a horizontal sectional view taken on the line 7—7 in FIG. 5.

As the body assembly 16 is moved from the position as seen in FIGS. 2, 3 and 4 to the position as seen in FIGS. 3A and 5, the air passageway 80 through cylinder base 28 into valve body opening 72 is closed off by the spool valve 74 with its appropriate O-ring seals. At the same time, the lower O-ring 88 is held by rushing air in its position against the lower edge of the spool valve body opening 72 and the inward taper of the lower portion of spool valve 74 allows this air to pass from the cylinder 26 through a central opening 90 in the valve 74 out to the side around the bottom end of the valve into atmosphere, thus relieving the pressure against the piston cup 48.

The permanent positioning of the spool valve 74 relative to the main frame 12 is accomplished by a valve stem 92 which, as best seen in FIG. 3, is fixedly mounted by appropriate lock nuts with respect to the main frame. The maximum upward and downward movement of the body assembly 16 to accomplish the precise alignment of the spool valve 74 and the spool valve body opening 72 as seen in FIGS. 3 and 3A is accomplished by a body assembly positioning bolt 94 threadably mounted in the bottom of the cylinder base 28 and by its bolt head and appropriate nuts, as clearly illustrated by comparing FIGS. 2, 3 and 4 with FIG. 5.

The maximum downward movement of the pressure limit stop bar 46 is determined by the positioning of a pair of yoke or bar stop machine screws 96,96 adjustably threadably mounted through, and extending upwardly from, cylinder base 28. As perhaps best seen in FIG. 4, appropriate lock nuts assure that the yoke stop machine screws will remain in fixed position.

In the invention as shown herein, there are nine separate settings to align nine different stop means with the stop bar 46. In a typical installation, using the air pressure regulator of the present invention connected to an air pressure source delivering air at approximately 120 pounds per square inch, and connected to a Model 02607 Sioux Stall Torque Air Driver, the following torque ranges have been obtained:

Position
   1=3 Inch Pounds
   2=5 Inch Pounds
   3=8 Inch Pounds 4 = 12 Inch Pounds
5 = 16 Inch Pounds
7 = 27 Inch Pounds
8 = 38 Inch Pounds
9 = 58 Inch Pounds It is to be understood that the pressure settings can, and normally will, be calibrated in pounds per square inch; but for operators of the air torque drivers, calibration in the number of inch pounds they need to perform the particular torquing function is more readily usable.

What is claimed is:

1. A fluid pressure regulator including:
   a main body member provided with an unregulated first pressure cavity, a regulated second pressure cavity and a valve seat between those cavities;
   a first conduit open from a source of air at a maximum pressure to said first cavity;
   a second conduit open from the second cavity to a location for use of air at a regulated pressure not greater than said maximum pressure;
   a diaphragm in sealing relation to said second cavity and spaced from said valve seat;
   a regulator valve operably associated with said diaphragm to move into sealing relation with respect to said valve seat responsive to movement of said diaphragm in a first direction away from said second cavity and to move into clearing relation to said valve seat responsive to movement of said diaphragm in a second direction toward said second cavity;
   a resilient pressure regulation means having a first end in force transmitting relation to said diaphragm in position to tend to move said diaphragm toward said second cavity;
   a regulation means harness on a second end of said resilient pressure regulation means;
   drive means operative on said harness to force said pressure regulation means to tend to move said diaphragm in said second direction;
   control means operative selectively to enable and to disable said drive means;
   a bar operably connected with said harness to move in a first direction responsive to movement of the harness in a first direction and to move in a second direction responsive to movement of the harness in a second direction under the influence of said drive means;
   bar movement stop means mounted with respect to said main body member in position to interrupt the movement of the bar in its second direction;
   said stop means being of configuration to interrupt the bar movement, when said drive means is enabled, at a specific predetermined distance from the valve seat, the minimum pressure in the second cavity at which the regulator valve first comes into sealing contact with the valve seat being an inverse function of the distance between the bar and the valve seat, when the bar is in contact with the stop means.

2. A multi-value air pressure regulator including:
   a main body member providing an unregulated first pressure cavity, a regulated second pressure cavity and a valve seat between those cavities;
   a diaphragm in sealing relation to said second cavity and spaced from said valve seat;
   a first conduit open from a source of air at a maximum pressure to said first cavity;
   a second conduit open from the second cavity to a location for use of air at a regulated pressure not greater than said maximum pressure;
   a regulator valve operably associated with said diaphragm to move into sealing relation with respect to said valve seat responsive to movement of said diaphragm in a first direction away from said second cavity and to move into clearing relation to said valve seat responsive to movement of said diaphragm in a second direction toward said second cavity;
   a pressure regulation spring having a first end in force-transmitting relation to said diaphragm in position to tend to move said diaphragm toward said second cavity;
   a spring harness on a second end of said pressure regulation spring;
   spring drive means operative on said spring harness to force said pressure regulation spring to tend to move said diaphragm in said second direction;
   control means operative selectively to enable and to disable said spring drive means;
   a bar operably connected with said spring harness to move in a first direction responsive to movement of the spring harness in a first direction and to move in a second direction responsive to movement of the harness in a second direction under the influence of said spring drive means;
   a plurality of bar movement stop means movably mounted with respect to said main body member and positionable to interrupt the movement of the bar in its second direction;
   said stop means being serially movable to selectively position any one of said stop means in operative inteferring alignment with said bar; and
   each of said stop means being of configuration, when in operative alignment with said bar, to interrupt the bar movement, when said drive means is enabled, at a different operative distance from the valve seat from that of other stop means when so aligned so that the minimum pressure in the second cavity at which the regulator valve first comes into sealing contact with the valve seat can be different for every stop means so aligned.

3. The air pressure regulator of claim 2 wherein:
   said stop means are serially movable with respect to said bar when said spring drive means is disabled by said control means.

4. The air pressure regulator of claim 2 wherein:
   the spring drive means includes a linear motor having a first end thereof fixedly mounted with respect to the main body member and a second end thereof operatively connected to said spring harness.

5. The air pressure regulator of claim 4 wherein said motor is a fluid driven piston cylinder motor.

6. The air pressure regulator of claim 5 wherein:
   the fluid motor includes a cylinder extending fixedly downwardly from the main body member and a piston operably mounted in the cylinder and operably connected to the spring harness.

7. The air pressure regulator of claim 6 wherein:
   a cylinder base seals the end of the cylinder opposite the main body member, and is provided with a control valve body opening therethrough;
   a cylinder base fluid passageway is open from outside of the cylinder base and cylinder to the control valve body opening;

the spring drive means also includes a source of fluid under pressure open through a fluid drive pressure conduit to the cylinder base fluid passageway;

the control means includes a control valve operably mounted in the control valve body opening, means to move the control valve between a first position wherein the cylinder base fluid passageway is open through the cylinder base control valve body opening to the cylinder and to the piston therein and a second position wherein the cylinder base fluid passageway is sealed off from the inside of the cylinder and pressure in the cylinder is relieved through the control valve means to the outside of the cylinder.

8. The air pressure regulator of claim 7 wherein:

the fluid pressure conduit is open between a source of air under pressure and the cylinder base fluid passageway;

the control valve is a spool valve provided with a pressure relief opening therethrough, said pressure relief opening being sealed closed when said control valve is in its first position and being open to the atmosphere when said control valve is in its second position.

9. The air pressure regulator of claim 8 wherein:

a body assembly includes the main body member, the cylinder, and the cylinder base;

said regulator includes a main frame;

said body assembly is mounted to said main frame for limited longitudinal movement with respect thereto;

said control valve is fixedly mounted with respect to said main frame; and said control means is operative to enable said spring drive means by movement of said body assembly in direction away from said control valve, and to disable said spring drive means by moving said body assembly toward said control valve.

10. The air pressure regulator of claim 9 wherein:

the drive pressure conduit is open to the source of air under presure supplying the first conduit.

11. The air pressure regulator of claim 10 wherein:

a body assembly anti-rotation bracket is fixedly mounted with respect to the main frame;

the fluid drive pressure conduit is open to the source of air in the first conduit through an air passageway provided in said main body member and open to the first pressure cavity therein, a portion of said drive pressure conduit extending rigidly outwardly from said main body member and into operative relation with respect to said anti-rotation bracket, the relationship between the rigid portion of the drive pressure conduit and the bracket being such as to permit limited longitudinal movement of the body assembly with respect to the main frame while preventing rotational movement of these two elements with respect to each other.

12. The air pressure regulator of claim 2 wherein:

the bar movement stop means collectively form part of a rotor ring assembly;

said rotor ring assembly also includes a pressure value selection rotor ring rotatably mounted with respect to the main body member;

each of said stop means is constituted as a pair of bar stroke stop members extending fixedly downwardly from said rotor ring at diametrically opposite sides of the ring;

said ring is selectively rotatable with respect said main body member to serially position any one of said pairs of stop members in operative interfering alignment with said bar.

13. The air pressure regulator of claim 12 wherein:

said rotor ring is provided with a plurality of threaded openings along a bottom edge thereof; and each of said stop members is threadably and adjustably mounted in one of said threaded openings to extend downwardly from said ring.

14. The air pressure regulator of claim 12 wherein:

indicia is provided on one of said main frame and said rotor ring assembly, and an indicator is provided on the other, the rotation of said ring with respect to said main frame causing said indicator to move relative to said indicia, said indicator and indicia being positioned and arranged so that alignment of each of the separate pairs of stop members with respect to the bar is indicated by a different positioning of the indicator with respect to the indicia.

15. The air pressure regulator of claim 12 wherein:

means is provided for positively aligning each said stop members with respect to the bar, said alignment means including a plurality of detents in one of the main body member and rotor ring, with a spring loaded detent means in facing relation to the other and in alignment with the detents, the positioning of the parts being such that each time the spring loaded detent member comes to rest in detent, one of the pairs of stop members will be in precise operative alignment with the bar.

16. The air pressure regulator of claim 6 wherein:

the bar movement stop means collectively form part of a rotor ring assembly;

said rotor ring assembly also includes a pressure value selection rotor ring rotatably mounted with respect to the main body member;

each of said stop means is constituted as a pair of bar stroke stop members extending fixedly downwardly from said rotor ring at diametrically opposite sides of the ring;

said ring is selectively rotatable with respect said main body member to serially position any one of said pair of stop members in operative interfering alignment with said bar.

17. The air pressure regulator of claim 16 wherein:

said rotor ring is provided with a plurality of threaded openings along a bottom edge thereof;

each of said stop members is threadably and adjustably mounted in one of said threaded openings to extend downwardly from said ring.

18. The air pressure regulator of claim 16 wherein:

means is provided for positively aligning each said stop members with respect to the bar, said alignment means including a plurality of detents in one of the main body member and rotor ring, with a spring loaded detent means in facing relation to the other and in alignment with the detents, the positioning of the parts being such that each time the spring loaded detent member comes to rest in detent, one of the pairs of stop members will be in precise operative alignment with the bar.

19. The air pressure regulator of claim 11 wherein:

the bar movement stop means collectively form part of a rotor ring assembly;

said rotor ring assembly also includes a pressure value selection rotor ring rotatably mounted with respect to the main body member;

each of said stop means is constituted as a pair of bar stroke stop members extending fixedly downwardly from said rotor ring at diametrically opposite sides of the ring;

said ring is selectively rotatable with respect said main body member to serially position any one of said pair of stop members in operative interfering alignment with said bar.

* * * * *